US011340765B2

(12) United States Patent
Liu

(10) Patent No.: US 11,340,765 B2
(45) Date of Patent: May 24, 2022

(54) METHOD, DEVICE AND STORAGE MEDIUM FOR DISPLAYING A DYNAMICALLY ADJUSTED CONTROL IN AN INTERFACE OF A MULTIMEDIA INFORMATION APPLICATION

(71) Applicant: Beijing Xiaomi Mobile Software Co., Ltd., Beijing (CN)

(72) Inventor: Xushu Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/833,167

(22) Filed: Mar. 27, 2020

(65) Prior Publication Data
US 2021/0149535 A1 May 20, 2021

(30) Foreign Application Priority Data
Nov. 20, 2019 (CN) .......................... 201911143346.6

(51) Int. Cl.
*G06F 3/0484* (2022.01)

(52) U.S. Cl.
CPC .................................. *G06F 3/0484* (2013.01)

(58) Field of Classification Search
CPC .................................................. G06F 3/0484
See application file for complete search history.

(56) References Cited

U.S. PATENT DOCUMENTS

| | | | | |
|---|---|---|---|---|
| 7,757,182 B2 * | 7/2010 | Elliott | ................... | G06F 3/0484 715/779 |
| 8,904,305 B2 * | 12/2014 | Queru | ................ | G06F 3/04886 715/784 |
| 9,047,005 B2 * | 6/2015 | Hill | ........................ | G06F 1/1654 |
| 9,454,411 B2 * | 9/2016 | Bhogal | .................. | G06F 9/542 |
| 10,338,799 B1 * | 7/2019 | Trncic | ..................... | G06F 3/165 |
| 10,635,384 B2 * | 4/2020 | Suzuki | ............... | G06F 3/04847 |
| 2004/0114475 A1 * | 6/2004 | Suzuki | ................ | G11B 27/105 369/30.08 |
| 2007/0263984 A1 * | 11/2007 | Sterner | ................ | G11B 27/034 386/234 |
| 2008/0036917 A1 * | 2/2008 | Pascarella | ............ | H04N 21/854 348/702 |
| 2009/0119688 A1 * | 5/2009 | Gupta | ..................... | G06F 9/451 719/328 |
| 2009/0254827 A1 * | 10/2009 | Gonze | ................. | G06F 9/44526 715/716 |
| 2010/0026640 A1 * | 2/2010 | Kim | .................... | G06F 3/04817 345/173 |

(Continued)

OTHER PUBLICATIONS

Extended European Search Report dated Oct. 28, 2020, in counterpart European Application No. 20171509.1-1203.

(Continued)

*Primary Examiner* — Dino Kujundzic
(74) *Attorney, Agent, or Firm* — Finnegan, Henderson, Farabow, Garrett & Dunner, L.L.P.

(57) ABSTRACT

A method for displaying an interface of a multimedia information application, includes: in response to detecting a first operation on a first control on an interface of a multimedia information application, displaying a second control on the interface; and in response to detecting a hiding trigger event, hiding the second control on the interface.

20 Claims, 12 Drawing Sheets

(56) References Cited

U.S. PATENT DOCUMENTS

| | | | | |
|---|---|---|---|---|
| 2011/0007008 | A1* | 1/2011 | Algreatly | G06F 3/04886 |
| | | | | 345/173 |
| 2012/0054612 | A1* | 3/2012 | Bok | H04N 21/4312 |
| | | | | 715/716 |
| 2013/0278708 | A1* | 10/2013 | Mock | G06F 3/0482 |
| | | | | 348/14.03 |
| 2015/0067596 | A1* | 3/2015 | Brown | G06F 3/0412 |
| | | | | 715/808 |
| 2015/0326688 | A1* | 11/2015 | Aarnio | G06F 16/683 |
| | | | | 707/748 |
| 2016/0041750 | A1* | 2/2016 | Cieplinski | G06F 3/04815 |
| | | | | 715/716 |
| 2016/0188181 | A1* | 6/2016 | Smith | G06F 3/04886 |
| | | | | 715/765 |
| 2016/0259517 | A1* | 9/2016 | Butcher | G06F 3/0488 |
| 2017/0060520 | A1* | 3/2017 | Cohen | G06F 3/165 |
| 2017/0185260 | A1* | 6/2017 | Mardirossian | H04N 21/4316 |
| 2019/0082214 | A1* | 3/2019 | Kim | H04N 21/4882 |

OTHER PUBLICATIONS

Anonymous, "Documentation: VLC for dummies", https://wiki.videolan.org/Documentation:VLC_for_dummies, Dec. 22, 2020.
Anonymous, "Documentation: Video and Audio Filters", https://wiki.videolan.org/index.php?title=Documentation:Vido_and_Audio_Filters&oldid=61094, Oct. 5, 2020.
Anonymous, "SongSubtitles.org", https://wiki.videolan.org/index.php?title=SongSubtitles.org&oldid=60437, Oct. 7, 2020.

* cited by examiner

METHOD, DEVICE AND STORAGE MEDIUM FOR DISPLAYING A DYNAMICALLY ADJUSTED CONTROL IN AN INTERFACE OF A MULTIMEDIA INFORMATION APPLICATION

CROSS-REFERENCE TO RELATED APPLICATIONS

This application is based on and claims priority to Chinese Application No. 201911143346.6 filed on Nov. 20, 2019, the content of which is incorporated by reference in its entirety.

TECHNICAL FIELD

The present disclosure generally relates to the technical field of electronic devices, and more particularly, to a method for display an interface of a multimedia information application, user equipment (UE), and a storage medium.

BACKGROUND

An increasing number of users are watching programs using smart UE. When a video or audio program is played at smart UE, controls such as information on a current program, pause, channel switch, volume regulation, fast forwarding, rewind, etc., may generally be arranged on a user interface (UI), which may affect display of content that is being played, and degrade user experience.

SUMMARY

According to a first aspect, a method for display at an interface of a multimedia information application includes: in response to detecting a first operation on a first control on an interface of a multimedia information application, displaying a second control on the interface; and in response to detecting a hiding trigger event, hiding the second control on the interface.

According to a second aspect, a device for display at an interface of a multimedia information application includes a processor and a memory storing an instruction executable by the processor. The processor is configured to: in response to detecting a first operation on a first control on an interface of a multimedia information application, display a second control on the interface; and in response to detecting a hiding trigger event, hide the second control on the interface.

According to a third aspect, a non-transitory computer-readable storage medium has stored thereon instructions that, when executed by a processor of user equipment (UE), cause the UE to perform the method according to the first aspect.

The above general description and elaboration below are exemplary and explanatory, and do not limit the present disclosure.

BRIEF DESCRIPTION OF THE ACCOMPANYING DRAWINGS

The drawings are incorporated in and constitute part of the specification, illustrate embodiments consistent with the disclosure, and together with the disclosure, serve to explain the principle of the disclosure.

DETAILED DESCRIPTION

Reference will now be made in detail to exemplary embodiments, examples of which are illustrated in the accompanying drawings. The following description refers to the accompanying drawings, in which the same numbers in different drawings represent the same or similar elements unless otherwise represented. Implementations set forth in the following exemplary embodiments do not represent all implementations consistent with the present disclosure. Rather, they are mere examples of devices and methods consistent with certain aspects of the present disclosure as recited in the accompanying claims.

Figure 1:
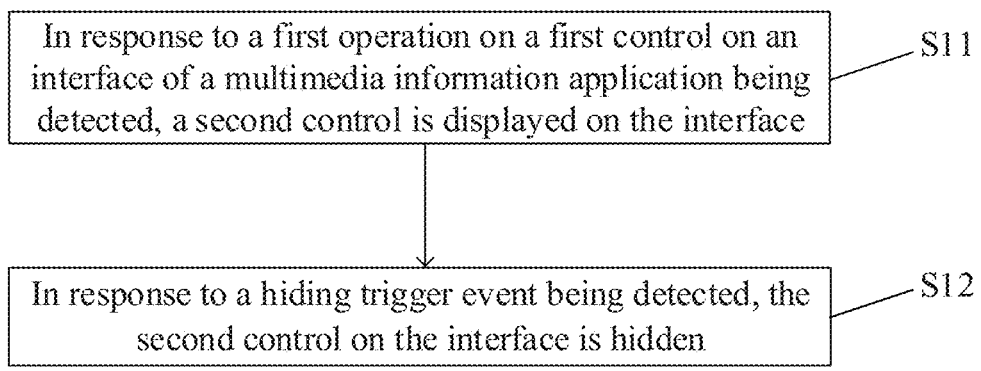
FIG. 1 is a flowchart of a method for display at an interface of a multimedia information application according to an embodiment.

FIG. 1 is a flowchart of a method for displaying an interface of a multimedia information application according to an embodiment. As shown in FIG. 1, the method may be applied to user equipment (UE), and include the following steps.

In step S11, in response to a first operation on a first control on an interface of a multimedia information application being detected, a second control is displayed on the interface.

In step S12, in response to a hiding trigger event being detected, the second control on the interface is hidden.

In an embodiment, the UE may include mobile UE, fixed UE, etc. The mobile UE may include a mobile phone, a tablet computer, wearable equipment, etc. The fixed UE may include, but is not limited to, a personal computer (PC). The UE may include a display. The display may also serve as a touch screen capable of receiving a touch operation of a user of the UE.

In an embodiment, a multimedia information application (app) may include a song playing application, a video playing application, an image browsing application, etc. When the multimedia information application is started and run at a foreground, an interface of the multimedia information application may be displayed on a display of the UE. A first control may be displayed on the interface.

In an embodiment, the interface may include at least a navigation page, a playing page, etc. Multimedia information may be played in the playing page. For example, the multimedia information application may be a song playing application. Then, the navigation page may be a home page of a music application. The navigation page may serve to display navigation information such as a recommended singer, a recommended genre, etc. The playing page may include a page for displaying a cover image of a figure of a songwriter. The playing page may include a page for displaying information on lyrics, etc.

In an embodiment, a user of the UE may control a multimedia information application to execute the same function or to execute different functions, based on an operation on a first control displayed on different interfaces.

For example, a second control may be displayed on a navigation page based on a first operation by the user of the UE on the navigation page. The second control may be displayed on a playing page based on a first operation by the user of UE on the playing page. The first operation may include an operation with a pressing strength greater than a preset strength threshold and/or a pressing duration longer than a preset duration.

In an embodiment, in response to an operation with a pressing strength less than the preset strength threshold and/or a pressing duration shorter than the preset duration, the multimedia information application may execute a different function respectively on a different interface.

For example, on a navigation page, in response to an operation on a first control with a pressing strength less than the preset strength threshold and/or a pressing duration shorter than the preset duration, a multimedia information application may play multimedia information. On a playing page where multimedia information is played, in response to an operation on a first control with a pressing strength less than the preset strength threshold and/or a pressing duration shorter than the preset duration, a multimedia information application may switch content displayed on the playing page, such as from a page for displaying a cover image of a figure to a page for displaying information on lyrics. Content displayed on a page for displaying a cover image of a figure may include an image of a figure related to multimedia information being played, such as a photo of a singer, a photo of a cover of an album, etc.

In an embodiment, the first control may be located at a different location on the interface corresponding to different content of the interface. For example, the first control may be located in the middle on the navigation page, or may be located at a corner on the playing page.

In an embodiment, the navigation page may be a sliding page. The navigation page may not be a focus of attention of the user of the UE. Therefore, the first control being located in the middle may have no impact on information displayed on the navigation page. However, information displayed on the playing page, such as information on lyrics, may be a focus of interest of the user. Therefore, arranging the first control at a corner on the playing page may reduce impact of the first control on information display, as well as reducing impact of the second control on information display when the second control is displayed based on the first control.

In an embodiment, the UE may display the second control on the interface based on the first operation of the user of the UE on the first control. The second control may serve a function different from that of the first control. The second control may be configured to control multimedia information that is being played. The second control may include at least one of: a pause control configured to pause play of multimedia information that is being played; a bookmarking control configured to bookmark multimedia information that is being played; a switch control configured to perform multimedia information switch, such as from playing first multimedia information being played to playing second multimedia information; or a volume control configured to control a volume of multimedia information that is being played.

In an embodiment, one or more second controls may be displayed on the interface. If there are multiple second controls, the multiple second controls may be displayed separately on the interface.

In an embodiment, compared to a control panel with pop-ups that includes multiple controls, multiple second controls may be displayed separately on the interface directly, reducing accidental touches by the user of the UE.

In an embodiment, since both the first control and the second control serve the user of the UE to control the multimedia information application, it may be arranged that the first control and the second control are separated from each other by a distance less than a distance threshold, with a relation between locations of the two controls being fixed with respect to each other. Accordingly, the user may conveniently touch the second control with no significant change in a location of touch. The distance between the first control and the second control and the relation between the locations of the two controls are not limited in the embodiment.

In an embodiment, not only the first control may be located on the interface at a different location corresponding to different content of the interface, but also the second control may be located on the interface at a different location corresponding to different content of the interface.

In an embodiment, the interface may include a navigation page. The navigation page may include a display region and a toolbar. At least one or more identifiers that identify multimedia information may be displayed in the display region. The toolbar may be located at a bottom of the display region. The first control may be located at a predetermined location on the toolbar. In an embodiment, the second control may be displayed on the interface (step S11) as follows: at least one second control may be displayed in the display region around the predetermined location.

In some embodiments, the display region may further include information on a poster of the multimedia information. The information on the poster and/or the identifier of the multimedia information may serve as a link for triggering play of the multimedia information. The identifier of the multimedia information may include at least a name of the multimedia information, such as a name of a song, a name of a video, etc.

Figure 2:
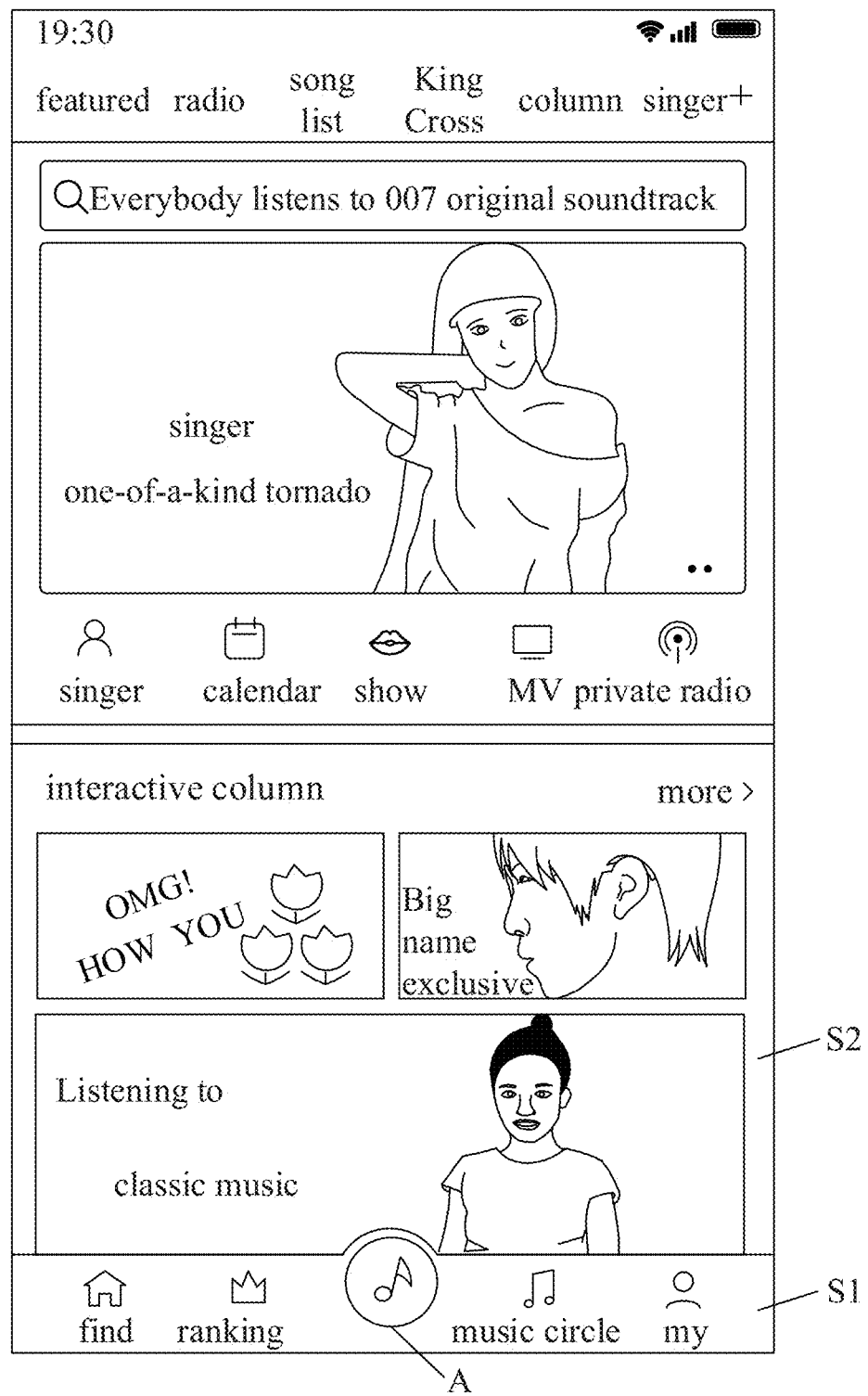
FIG. 2 is a schematic diagram of displaying a navigation page in a song playing application according to an embodiment.
Figure 3:
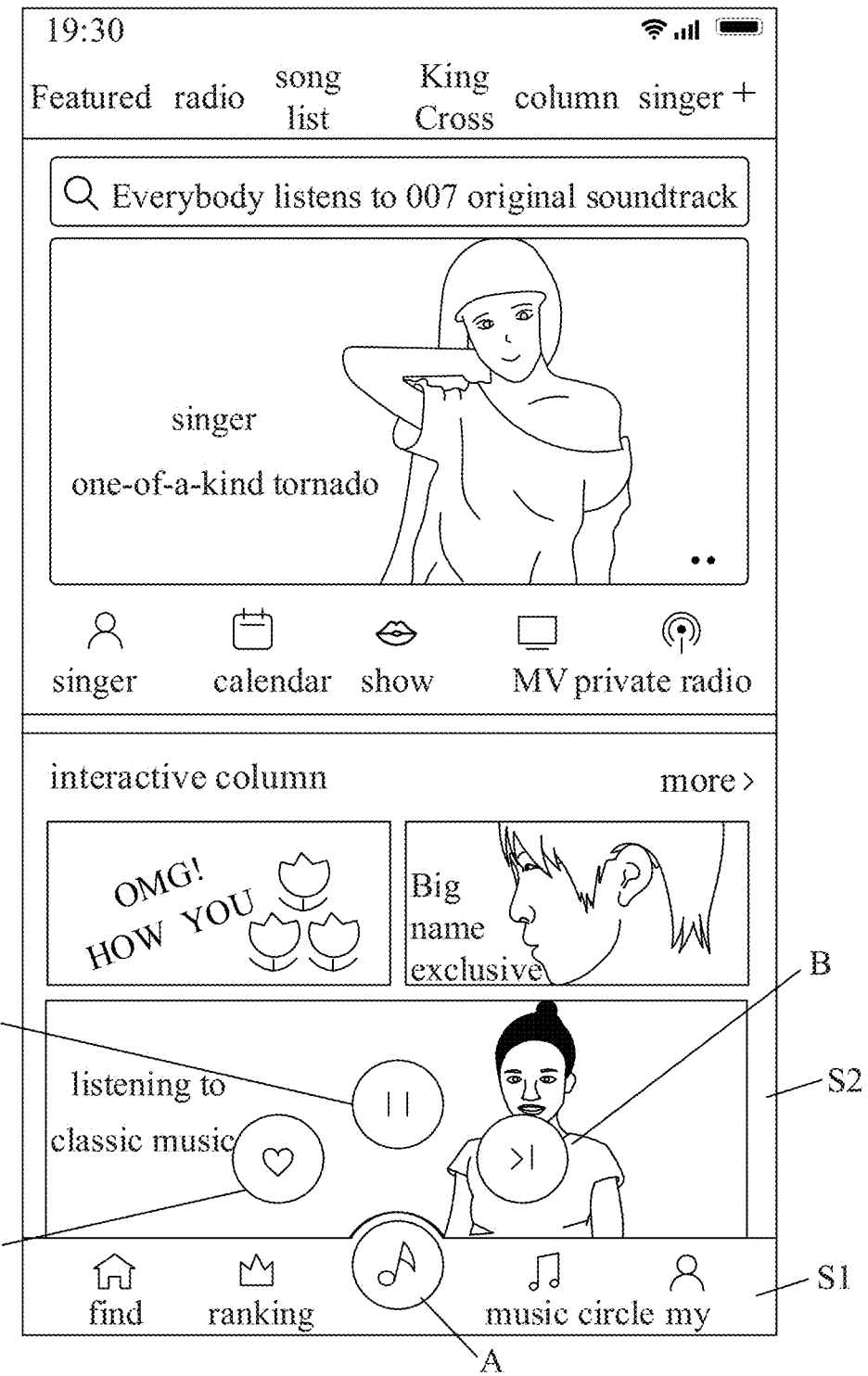
FIG. 3 is a schematic diagram of displaying a navigation page in a song playing application according to an embodiment.

FIG. 2 is a schematic diagram of displaying a navigation page in a song playing application according to an embodiment. As shown in FIG. 2, a region S1 may be the toolbar, and a region S2 may be the display region. A first control A is in the middle of the region S1. FIG. 3 is a schematic diagram of displaying a navigation page in a song playing application according to an embodiment. Based on the first operation of a user of the UE on the first control A in the middle of the region S1, at least one second control may be displayed in the display region around the first control A in the middle. In FIG. 3, three second controls B are displayed on the interface, including a pause control for pausing play of a song, a bookmarking control for bookmarking a song, and a switch control for song switch.

In the embodiment, the second controls B are displayed around the first control A, facilitating touch operation. In addition, with surrounding deployment, as many second controls as possible may be displayed. Further, rather than being displayed on the toolbar S1, the second controls B are displayed in the display region S2, thereby reducing blocking of another control fixedly displayed on the toolbar S1. A control displayed on the toolbar may be touched more frequently than a second control, for example.

Figure 4:
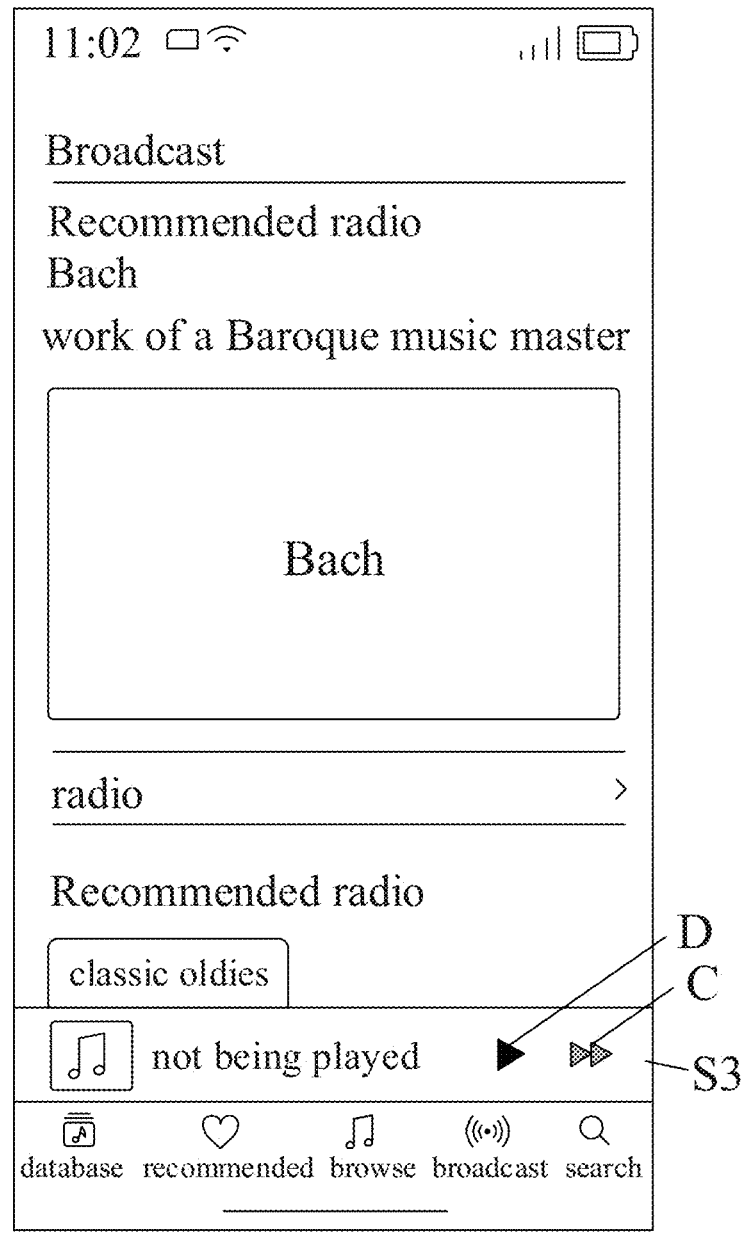
FIG. 4 is a schematic diagram of displaying a navigation page in a song playing application in related art.

FIG. 4 is a schematic diagram of displaying a navigation page in a song playing application in related art. As shown in FIG. 4, a region S3 may be a control panel for controlling play of a song. The control panel may cover content displayed in the navigation page. The control panel may include two controls, i.e., a control C and a control D. Any control configured to control play of a song may be displayed on the navigation page.

FIG. 3 and FIG. 4 are different in at least that, a second control is hidden in the embodiment illustrated in FIG. 3, allowing the UE to display more information displayed on the interface to the user of the UE.

In an embodiment, the interface may include a playing page. Multimedia information may be played in the playing page. A first region of the playing page may be configured to display text content. The text content may be associated with multimedia information that is being played. The text content may be subject to dynamic switch. In an embodiment, the second control may be displayed on the interface (step S11) as follows: the second control may be displayed in a second region of the playing page. The second region may be a region on the playing page other than the first region, or may be part of the first region.

In an embodiment, the first region may differ from the second region, or may be part of the first region. When the second region differs from the first region, the second control in the second region will have no impact on the text content that is associated with the multimedia information being played and that is subject to dynamic switch. When the second region is part of the first region, as the second control is a displayable hidable floating control, a hidden second control may have no impact on display of text content in the first region. Locations of the first region and the second region on the playing page are not limited in the embodiment.

In an embodiment, the playing page may be an audio playing page. The first region may be a middle region of the playing page. The second region may be a corner region of the playing page. The corner region may be located outside the middle region.

In an embodiment, since the second region is a corner region outside the middle region, text content displayed in the first region will not be covered by the second region. Since the first region is configured to display text content that is associated with the multimedia information being played and that is subject to dynamic switch, arranging the first region in the middle region may facilitate view by the user of the UE. The second region may be configured to display the second control. The user of the UE may not frequently operate the second control. Accordingly, arranging the second region in the corner region may improve experience of the user of the UE.

In an embodiment, text content may include lyrics of a song displayed by scrolling, subtitles of broadcast displayed by scrolling, which is not limited in the embodiment.

Figure 5:
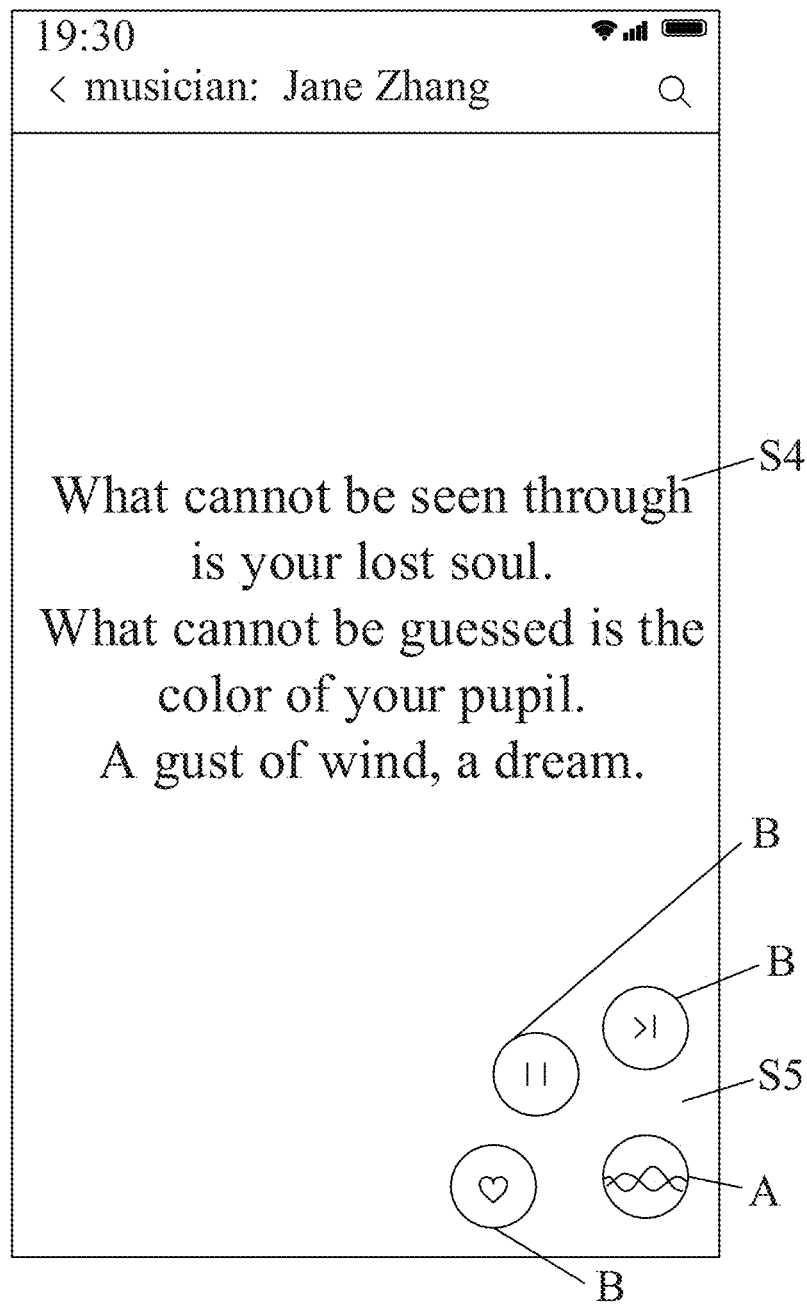
FIG. 5 is a schematic diagram of displaying a playing page in a song playing application according to an embodiment.

FIG. 5 is a schematic diagram of displaying a playing page in a song playing application according to an embodiment. As shown in FIG. 5, on a playing page for playing a song, a first region S4 is located in a middle region of the playing page. Lyrics associated with the song may be displayed in the first region S4. A second region S5 may be located in a corner region to the right in the playing page. Three second controls B may be displayed in the second region S5. As described above, the location of a first control may differ depending on content of the interface. The location of the first control with respect to the location of a second control may be fixed. In FIG. 5, the first control A may also be located in the second region S5. The three second controls B may be displayed in the corner region around the first control A. A distance between a respective second control and the first control may be the same as the distance between the second control and the first control in FIG. 3.

Figure 6:
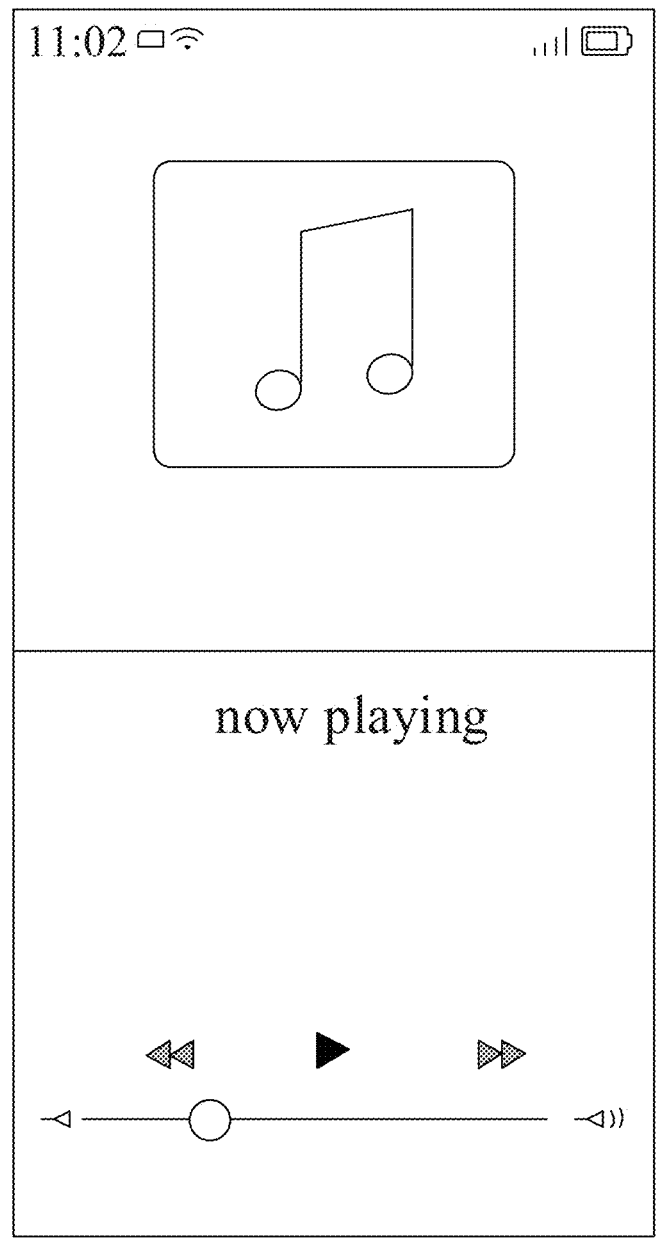
FIG. 6 is a schematic diagram of displaying a playing page in a song playing application in related art.

FIG. 6 is a schematic diagram of displaying a playing page in a song playing application in related art. As shown in FIG. 6, after a jump from the navigation page in FIG. 4 to the playing page in FIG. 6, a height of the control panel may increase. A region in the playing page where multimedia information may be displayed may decrease.

In an embodiment, since the user of the UE may focus on content associated with multimedia information on a playing page, such as text content displayed dynamically, the first control and the second control may be arranged in a second region having no impact on the first region of the playing page, improving experience of the user of the UE.

Note that a relationship between locations of the first control and the second control illustrated in the embodiments is exemplary. The location of the first control or the second control is not limited by the embodiments. Moreover, the location where the first control or the second control is displayed may also be adjusted based on an operation of the user of the UE. For example, the user of UE may configure any of second controls displayed separately according to a habit of the user.

In an embodiment, a parameter for displaying the first control may differ depending on an interface of an app. For example, in the navigation page shown in FIG. 2 and FIG. 3, the first control may be displayed in form of a musical note. In the playing page shown in FIG. 5, the first control may be displayed in form of a wave.

In an embodiment, while multimedia information is being played, a parameter for displaying the first control may be adjusted dynamically according to a circumstance of playing the multimedia information. The circumstance of playing the multimedia information may include at least one of: a progress in playing the multimedia information being played, a tone of an audio being played, a circumstance of switching between different multimedia information, etc. The parameter may include at least one of: a color in which the first control is displayed, a brightness with which the first control is displayed, a form in which the first control is displayed, an area over which the first control is displayed, etc.

A parameter for displaying the first control may be changed, thereby changing a result of displaying the first control. Accordingly, the result of displaying the first control may be changed to display different circumstances of play before a user without adding content to be displayed or occupying an additional area for display.

As shown in FIG. 5, in an embodiment, the first control A may be displayed in form of a wave, changing dynamically according to a tone of a song. The first control A may also be displayed dynamically according to a progress in playing multimedia information. For example, the first control A may be displayed dynamically in form of a progress bar. Also for example, an area over which the first control A is displayed, a brightness with which the first control A is displayed, etc., may be adjusted dynamically according to a current tone, a progress in playing the multimedia information, etc.

In an embodiment, switch between different multimedia information may include automatic multimedia information switch, a switching operation executed by the user of the UE based on a switch control, etc. A switch control may be a second control. Again referring to a song playing application as an example, the UE may be playing a song E based on the app. After play of the song E completes, the song playing app may automatically switch to a song F, such that the UE may continue to play. Alternatively, a user of the UE may switch to the song F through a switch control while the song E is still being played.

Figure 7:
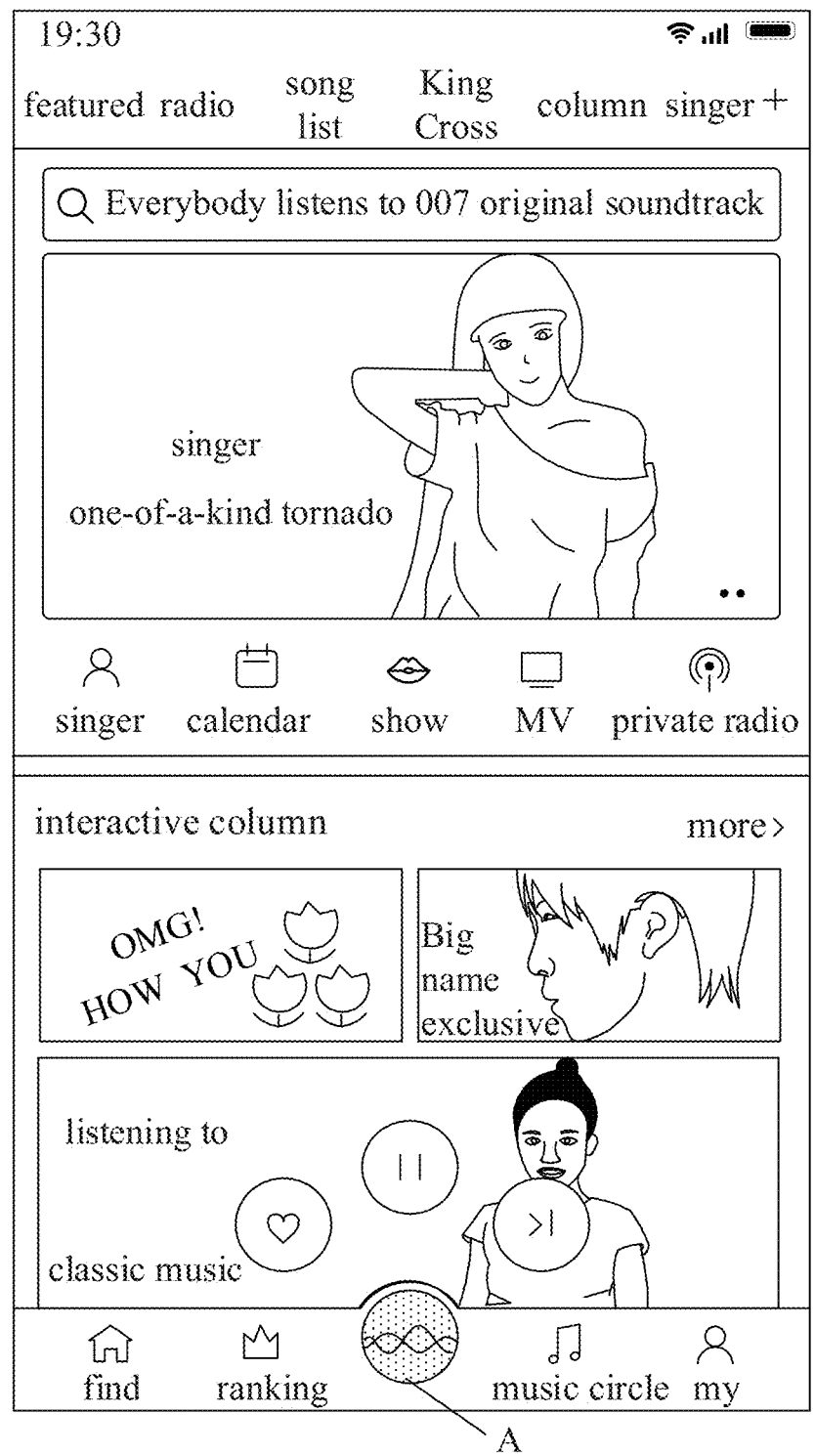
FIG. 7 is a schematic diagram of displaying a first control on a navigation page in a song playing application according to an embodiment.

FIG. 7 is a schematic diagram of displaying a first control on a navigation page in a song playing application according to an embodiment. As shown in FIG. 7, an interface of the app of the UE may be a navigation page. The song playing application may be in a song playing state. A first control A may be displayed in form of a wave. The first control A may be displayed in a first color.

Figure 8:
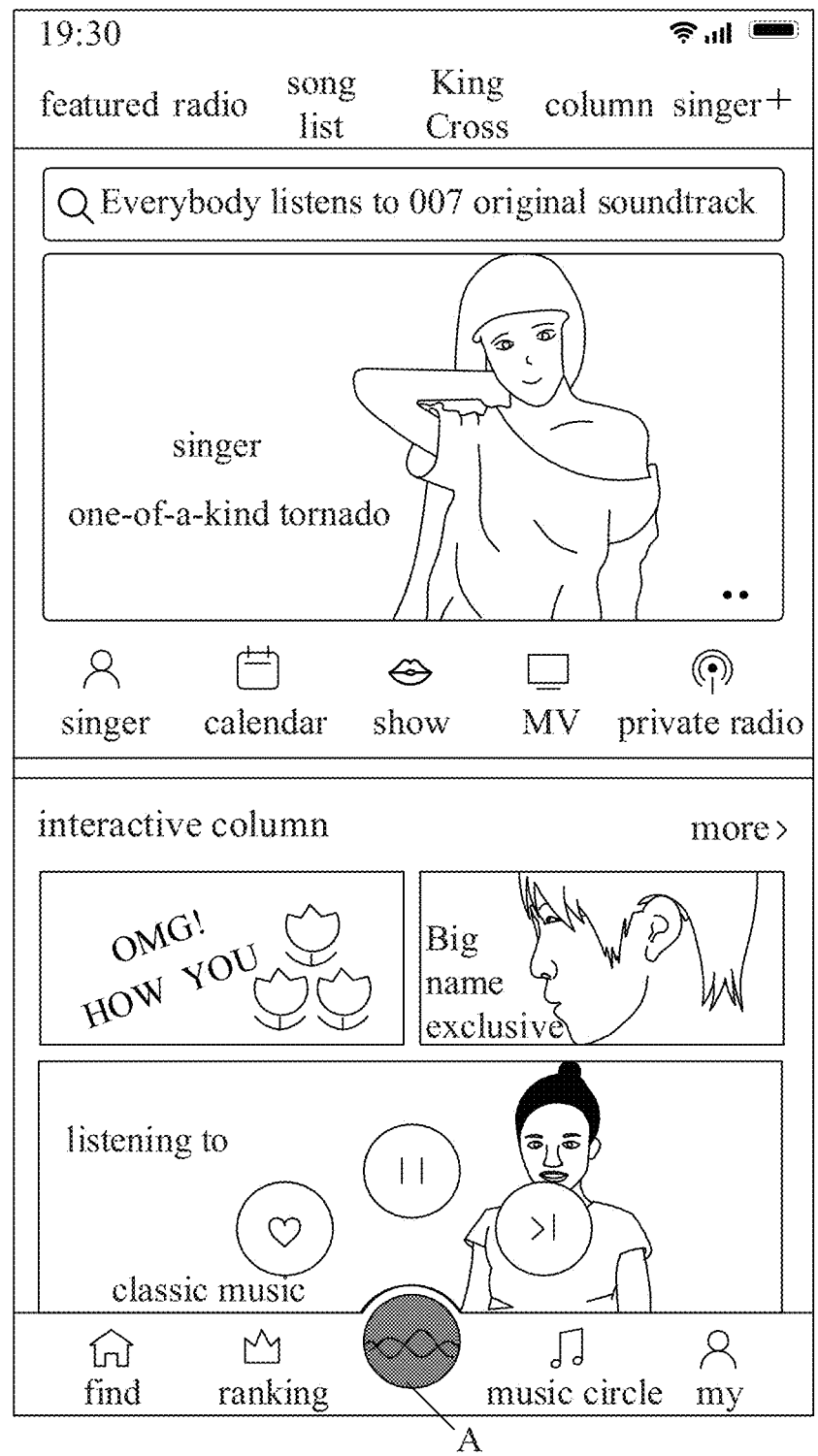
FIG. 8 is a schematic diagram of displaying a first control on a navigation page in a song playing application according to an embodiment.

FIG. 8 is a schematic diagram of displaying a first control on a navigation page in a song playing application according to an embodiment. Upon a song switch such as an automatic song switch or a switch controlled by a user of the UE based on a switch control, as shown in FIG. 8, the first control A may be displayed in form of a wave. The first control A may be displayed in a second color.

In FIG. 7 and FIG. 8, the first control A may adjust the color in which the first control A is displayed according to the circumstance of switching between multimedia information. In an embodiment, the color in which the first control A is displayed may be adjusted randomly. In an embodiment, the color in which the first control A is displayed may be adjusted according to a color of a background of the playing page.

Figure 9:
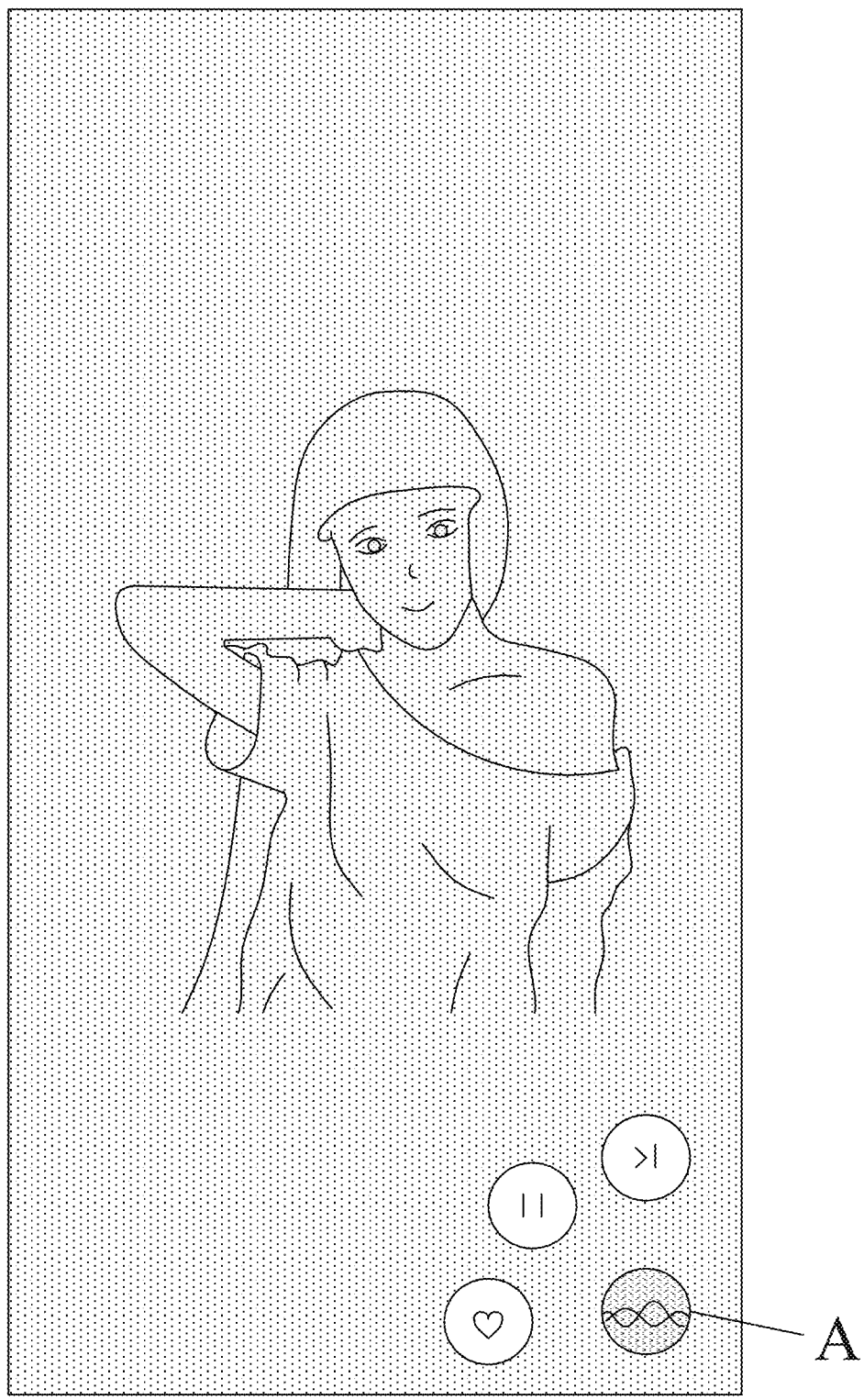
FIG. 9 is a schematic diagram of displaying a first control on a playing page in a song playing application according to an embodiment.
Figure 10:
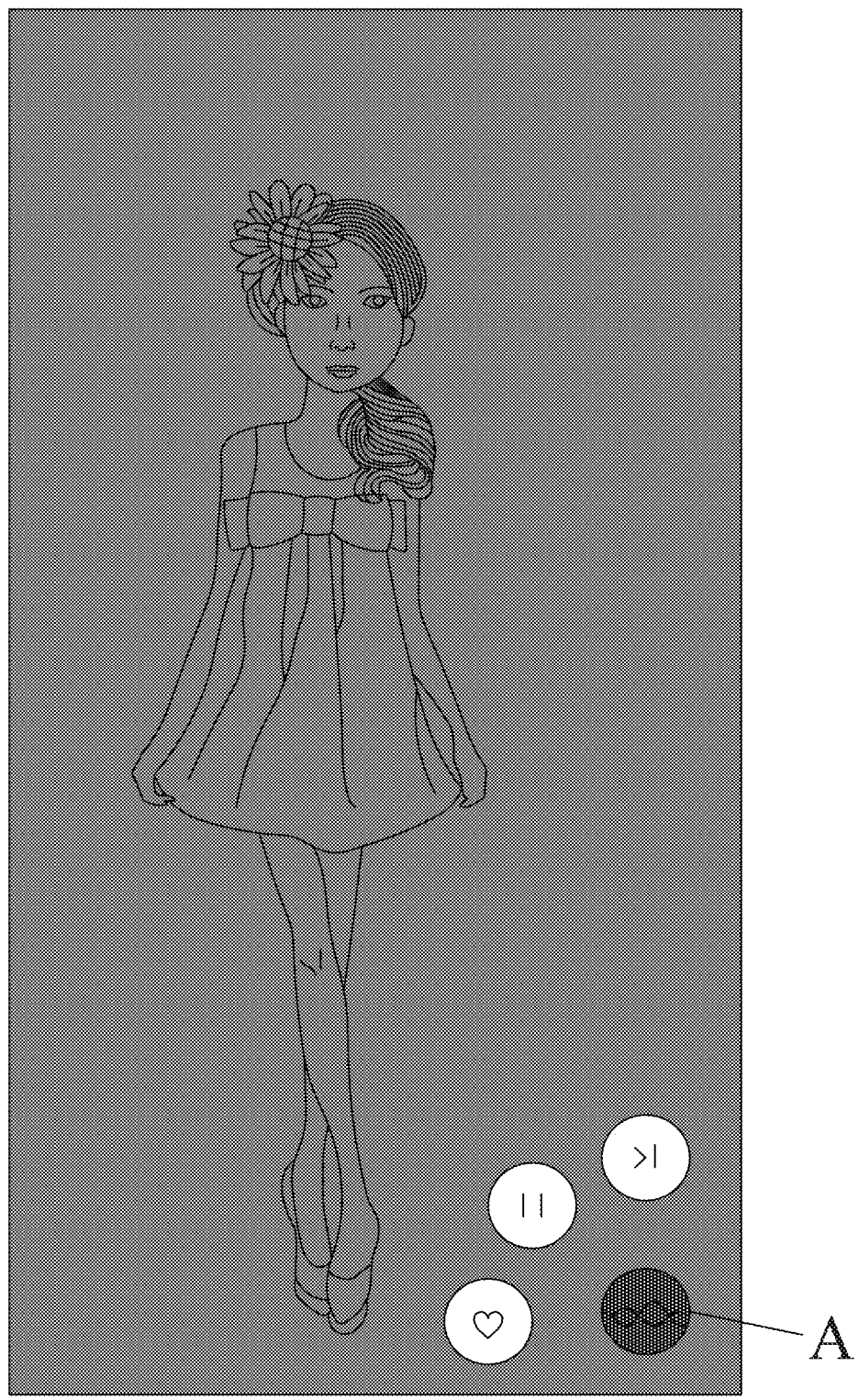
FIG. 10 is a schematic diagram of displaying a first control on a playing page in a song playing application according to an embodiment.

FIG. 9 is a schematic diagram of displaying a first control on a playing page in a song playing application according to an embodiment. FIG. 10 is a schematic diagram of displaying a first control on a playing page in a song playing application according to an embodiment. As shown in FIG. 9 and FIG. 10, a cover image of a different figure corresponding to a different song may be displayed on the playing page. A background of the cover image of the different figure may be of a different color. In FIG. 9, the UE may control to display the first control A in a third color according to a first color of a background. When the color of the background changes based on an automatic song switch, in FIG. 10, the UE may control to display the first control A in a fourth color according to a second color of the background.

In the embodiments, while multimedia information is being played, a parameter for displaying the first control may be adjusted dynamically according to a circumstance of playing the multimedia information. By dynamically adjusting a parameter for display, a user may be signaled of a progress in display, a switch state, etc., thereby improving user experience. Adapting the color in which the first control is displayed to the color of the background further improves user experience.

In an embodiment, step S12 (FIG. 1) may include an operation as follows.

When it is detected that the second control has been displayed for longer than a preset duration threshold, the second control on the interface may be hidden.

When a second operation on the first control is detected, the second control on the interface may be hidden.

When it is detected that an operation on the second control completes, the second control on the interface may be hidden.

In the embodiment, after a second control has been displayed, the second control may be hidden based on a different trigger event. For example, when it is detected that the second control has been displayed for longer than a preset duration threshold, the second control may be hidden. For example, after the second control has been displayed, a second press on the first control may trigger hiding of the second control. The press operation may be the second operation. Another example of a trigger event may be detection of completion of an operation by the user of the UE on a switch control.

In an embodiment, when it is detected that the operation on the second control completes, the second control on the interface may be hidden as follows: when a third operation on at least one second control is detected, the second control on the interface may be hidden.

In the embodiment, an operation on a second control is referred to as a third operation. Having displayed a second control based on a first operation with a pressing duration longer than a preset duration, the UE may receive a third operation of the user of the UE on the second control. If the UE detects the third operation on at least one second control, the UE may hide the second control on the interface.

In an embodiment, having displayed a second control based on a first operation with a pressing duration longer than a preset duration, if the user of the UE ends the first operation and performs no further operation through a touch screen, the second control may be hidden. If the UE detects a first operation, a third operation, and a fourth operation connecting the first operation and the third operation, the first operation, the third operation, and the fourth operation may be a continuous operation performed by the user at once. When the continuous operation ends, a second control on the interface may be hidden.

In the embodiment, a second control is hidden based on a detected hiding trigger event that triggers hiding the second control, allowing more content displayed on the interface to be displayed before the user of the UE, improving user experience.

In the embodiments of the present disclosure, a first control is displayed on an interface of a multimedia information application. A second control is displayed based on detection of a first operation on the first control. Hiding of the second control saves a region for displaying the second control on the interface. Accordingly, a greater region on the interface may be available for displaying other information content. In addition, interference of the second control to other information is reduced. When display of the second control on the interface is triggered based on the first operation, the multimedia information application may be controlled, based on the second control, to execute a predetermined function configured for the second control, thereby ensuring diversity of functions of the multimedia information application. Therefore, switch between hiding and display of a second control is performed, improving user experience.

Embodiments of the present disclosure also provide a device for displaying an interface of a multimedia information application, which may be part of UE or the UE. The device may include a processor and memory. The processor may be configured to perform the above described method for displaying an interface of a multimedia information application.

Figure 11:
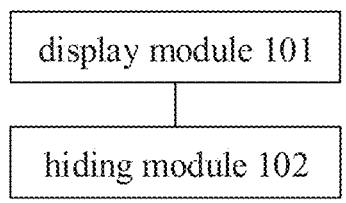
FIG. 11 is a block diagram of a device for display at an interface of a multimedia information application according to an embodiment.

FIG. 11 is a block diagram of a device for displaying an interface of a multimedia information application according to an embodiment. Referring to FIG. 11, the device may include a display module 101 and a hiding module 102.

The display module 101 is configured to, in response to detecting a first operation on a first control on an interface of a multimedia information application, display a second control on the interface. The hiding module 102 is configured to, in response to detecting a hiding trigger event, hide the second control on the interface.

The interface may include a playing page. Multimedia information may be played in the playing page. A first region of the playing page may be configured to display text content. The text content may be associated with multimedia information being played. The text content may be subject to dynamic switch.

The display module 101 may be configured to display the second control in a second region of the playing page. The second region may be a region on the playing page other than the first region, or may be part of the first region. The playing page may be an audio playing page. The first region may be a middle region of the playing page. The second region may be a corner region of the playing page. The corner region may be located outside the middle region.

The interface may include a navigation page. The navigation page may include a display region and a toolbar. At least one or more identifiers that identify multimedia information may be displayed in the display region. The toolbar may be located at the bottom of the display region. The first control may be located at a predetermined location on the toolbar, The display module 101 may be configured to display at least one second control in the display region around the predetermined location.

The device may further include an adjusting module (not shown) configured to, while multimedia information is being played, dynamically adjusting a parameter for displaying the first control according to a circumstance of playing the multimedia information. The circumstance of playing the multimedia information may include at least one of: a progress in playing the multimedia information being played, a tone of an audio being played, or a circumstance of switching between distinct multimedia information. The parameter may include at least one of: a color in which the first control is displayed, a brightness with which the first control is displayed, a form in which the first control is displayed, or an area over which the first control is displayed.

The hiding module 102 may be configured to, in response to detecting that the second control has been displayed for longer than a preset duration threshold, hiding the second control on the interface. The hiding module 102 may be configured to, in response to detecting a second operation on the first control, hiding the second control on the interface. The hiding module 102 may be configured to, in response to detecting that an operation on the second control completes, hiding the second control on the interface. The hiding module 102 may be configured to, in response to detecting a third operation on at least one second control, hiding the second control on the interface.

The operations performed by each module of the device have been described above in the method embodiments, and will not be repeated here.

Figure 12:
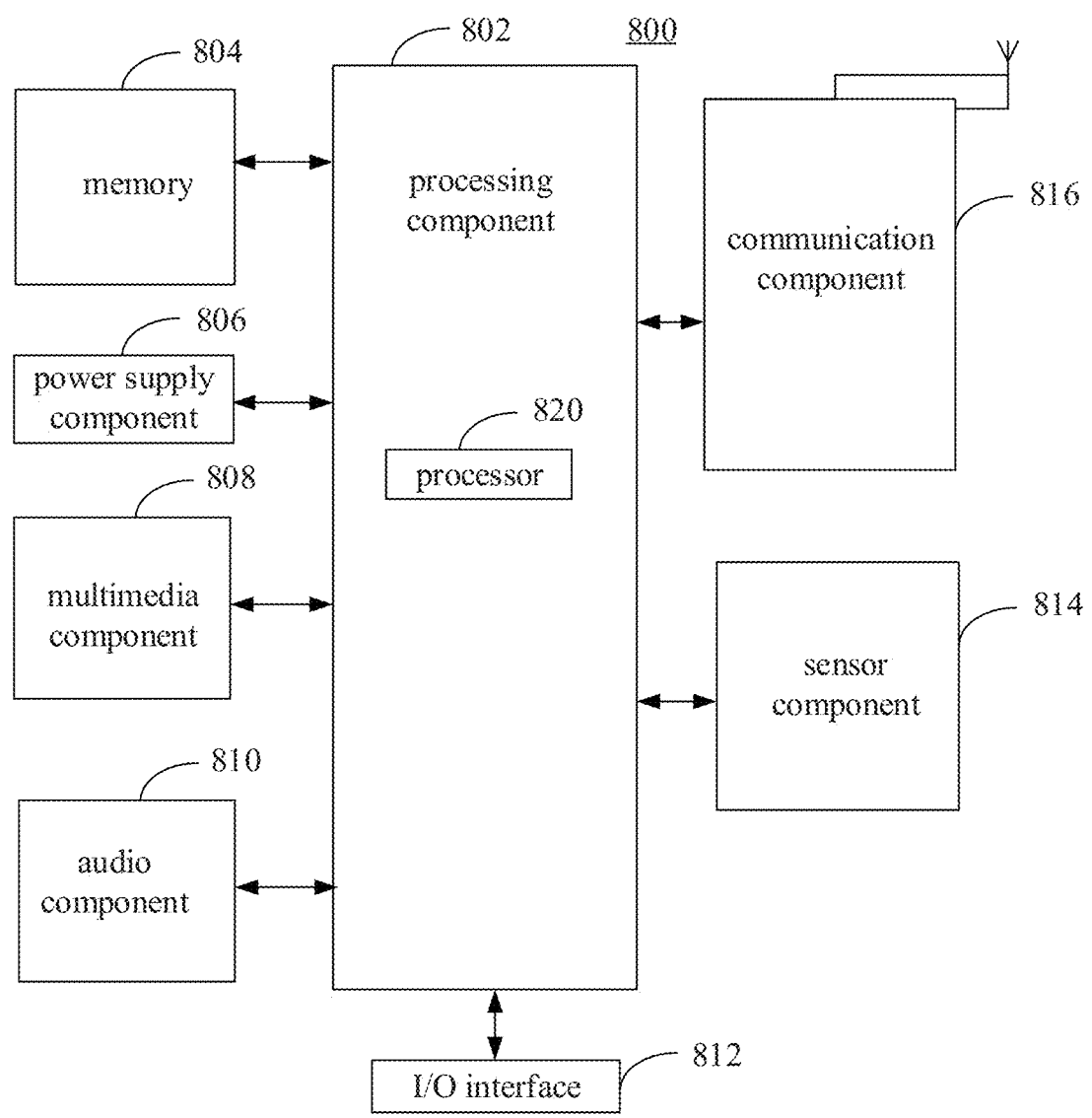
FIG. 12 is a block diagram of UE according to an embodiment.

FIG. 12 is a block diagram of a device 800 according to an embodiment. For example, the device 800 may be UE such as a phone, a computer, etc.

Referring to FIG. 12, the device 800 may include one or more of a processing component 802, memory 804, a power supply component 806, a multimedia component 808, an audio component 810, an Input/Output (I/O) interface 812, a sensor component 814, a communication component 816, etc.

The processing component 802 may generally control an overall operation of the device 800, such as operations associated with display, a telephone call, data communication, a camera operation, a recording operation, etc. The processing component 802 may include one or more processors 820 to execute instructions, so as to complete all or some steps of the method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 may be configured to store various types of data to support the operation at the device 800. Examples of such data may include instructions of any application or method adapted to operating on the device 800, contact data, phone book data, messages, pictures, videos, etc. The memory 804 may be realized by any type of transitory or non-transitory storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, or a compact disk.

The power supply component 806 may supply electric power to various components of the device 800. The power supply component 806 may include a power management system, one or more power sources, and other components related to generating, managing and distributing electricity for the device 800.

The multimedia component 808 may include a screen providing an output interface between the device 800 and a user. The screen may include a Liquid Crystal Display (LCD), a Touch Panel (TP), etc. If the screen includes a TP, the screen may be realized as a touch screen to receive an input signal from a user. The TP may include one or more touch sensors for sensing touch, slide and gestures on the TP. The touch sensors not only may sense the boundary of a touch or slide move, but also detect the duration and pressure related to the touch or slide move. The multimedia component 808 may include a front camera and/or a rear camera. When the device 800 is in an operation mode such as a photographing mode or a video mode, the front camera and/or the rear camera may receive external multimedia data. Each of the front camera or the rear camera may be a fixed optical lens system or may have a focal length and be capable of optical zooming.

The audio component 810 may be configured to output and/or input an audio signal. For example, the audio component 810 may include a microphone (MIC). When the device 800 is in an operation mode such as a call mode, a recording mode, and a voice recognition mode, the MIC may be configured to receive an external audio signal. The received audio signal may be further stored in the memory 804 or may be sent via the communication component 816.

The audio component 810 may further include a loudspeaker configured to output the audio signal.

The I/O interface 812 may provide an interface between the processing component 802 and a peripheral interface module. Such a peripheral interface module may be a keypad, a click wheel, a button, and/or the like. Such a button may include but is not limited to: a homepage button, a volume button, a start button, and a lock button.

The sensor component 814 may include one or more sensors for assessing various states of the device 800. For example, the sensor component 814 may detect an on/off state of the device 800 and relative positioning of components such as the display and the keypad of the device 800. The sensor component 814 may further detect a change in the position of the device 800 or of a component of the deice 800, whether there is contact between the device 800 and a user, the orientation or acceleration/deceleration of the device 800, a change in the temperature of the device 800. The sensor component 814 may include a proximity sensor configured to detect existence of a nearby object without physical contact. The sensor component 814 may further include an optical sensor such as a Complementary Metal-Oxide-Semiconductor (CMOS) or a Charge-Coupled-Device (CCD) image sensor used in an imaging application. The sensor component 814 may further include an acceleration sensor, a gyroscope sensor, a magnetic sensor, a pressure sensor, or a temperature sensor.

The communication component 816 may be configured to facilitate wired or wireless communication between the device 800 and other equipment. The device 800 may access a wireless network based on a communication standard such as Wi-Fi, 4G, 5G, or a combination thereof. The communication component 816 may broadcast related information or receive a broadcast signal from an external broadcast management system via a broadcast channel. The communication component 816 may further include a Near Field Communication (NFC) module for short-range communication. The communication component 816 may be based on technology such as Radio Frequency Identification (RFID), Infrared Data Association (IrDA), Ultra-Wideband (UWB) technology, Bluetooth (BT), etc.

The device 800 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to perform the above-described methods.

In an embodiment, a non-transitory computer-readable storage medium including instructions, such as the memory 804 including instructions, may be provided. The instructions may be executed by the processor 820 of the device 800 to perform the above-described methods. The non-transitory computer-readable storage medium may be Read-Only Memory (ROM), Random Access Memory (RAM), Compact Disc Read-Only Memory (CD-ROM), a magnetic tape, a floppy disk, optical data storage equipment, and/or the like.

Other embodiments of the present disclosure will be apparent to one skilled in the art after considering the present disclosure and practiced the invention disclosed herein. This application is intended to cover any variation, use, or adaptation of the present disclosure following the general principle of the present disclosure and including such departures from the present disclosure as come within known or customary practice in the art. The described embodiments are exemplary only, with a true scope and spirit of the present disclosure being indicated by the appended claims.

The subject disclosure is not limited to the exact construction that has been described above and illustrated in the accompanying drawings. Various modifications and changes can be made without departing from the scope of the present disclosure. It is intended that the scope of the present disclosure be limited only by the appended claims.

What is claimed is:

1. A method for displaying an interface of a multimedia information application, comprising:
   in response to detecting a first operation on a first control on the interface of the multimedia information application, displaying a second control on the interface;
   in response to detecting a hiding trigger event, hiding the second control on the interface; and
   when multimedia information is being played, dynamically adjusting a parameter for displaying the first control according to a circumstance of playing the multimedia information,
   wherein the parameter comprises at least one of: a color in which the first control is displayed, or a brightness with which the first control is displayed, and
   the circumstance of playing the multimedia information comprises at least one of: a progress in playing the multimedia information being played, or a tone of an audio being played,
   wherein the interface comprises a navigation page and a playing page separated from the navigation page, the first operation comprises an operation with at least one of a pressing strength greater than a preset strength threshold or a pressing duration longer than a preset duration, and the method further comprises:
     on the navigation page, in response to detecting an operation on the first control with at least one of a pressing strength less than the preset strength threshold or a pressing duration shorter than the preset duration, playing the multimedia information on the playing page; and
     on the playing page where the multimedia information is played, in response to detecting the operation on the first control with at least one of the pressing strength less than the preset strength threshold or the pressing duration shorter than the preset duration, switching content displayed on the playing page, and
   wherein the second control comprises multiple second controls, and
   displaying the second control comprises displaying the multiple second controls separately around the first control, wherein the first control and the multiple second controls are separated from each other by a distance less than a distance threshold, with a relation between locations of two controls being fixed with respect to each other.

2. The method of claim 1, wherein:
   a first region of the playing page is configured to display text content associated with the multimedia information being played, the text content being subject to dynamic switch,
   wherein the displaying the second control on the interface comprises:
   displaying the second control in a second region of the playing page, wherein the second region is one of a region on the playing page other than the first region, or a part of the first region.

3. The method of claim 2, wherein:
   the playing page is an audio playing page, the first region is a middle region of the playing page, and
the second region is a corner region of the playing page,
the corner region being located outside the middle region.

4. The method of claim 1, wherein:
the navigation page comprises a display region and a toolbar,
at least one or more identifiers that identify the multimedia information are displayed in the display region,
the toolbar is located at a bottom of the display region, and
the first control is located at a predetermined location on the toolbar,
wherein the displaying the second control on the interface comprises:
displaying the second control in the display region around the predetermined location.

5. The method of claim 1, wherein the in response to detecting the hiding trigger event, hiding the second control on the interface comprises at least one of:
in response to detecting that the second control has been displayed for longer than a preset duration threshold, hiding the second control on the interface;
in response to detecting a second operation on the first control, hiding the second control on the interface; or
in response to detecting that an operation on the second control completes, hiding the second control on the interface.

6. The method of claim 5, wherein the in response to detecting that the operation on the second control completes, hiding the second control on the interface comprises:
hiding the second control on the interface in response to detecting a third operation on at least one second control.

7. The method of claim 1, wherein the circumstance of playing the multimedia information further comprises a circumstance of switching between different multimedia information,
wherein the parameter further comprises at least one of:
a form in which the first control is displayed, or
an area over which the first control is displayed.

8. A device for displaying an interface of a multimedia information application, comprising:
a processor; and
a memory storing an instruction executable by the processor,
wherein the processor is configured to:
in response to detecting a first operation on a first control on the interface of the multimedia information application, display a second control on the interface;
in response to detecting a hiding trigger event, hide the second control on the interface; and
when multimedia information is being played, dynamically adjust a parameter for displaying the first control according to a circumstance of playing the multimedia information,
wherein the parameter comprises at least one of: a color in which the first control is displayed, or a brightness with which the first control is displayed, and
the circumstance of playing the multimedia information comprises at least one of: a progress in playing the multimedia information being played, or a tone of an audio being played,
wherein the interface comprises a navigation page and a playing page separated from the navigation page, the first operation comprises an operation with at least one of a pressing strength greater than a preset strength threshold or a pressing duration longer than a preset duration, and the processor is further configured to:
on the navigation page, in response to detecting an operation on the first control with at least one of a pressing strength less than the preset strength threshold or a pressing duration shorter than the preset duration, play the multimedia information on the playing page; and
on the playing page where the multimedia information is played, in response to detecting the operation on the first control with at least one of the pressing strength less than the preset strength threshold or the pressing duration shorter than the preset duration, switch content displayed on the playing page, and
wherein the second control comprises multiple second controls, and
the processor is configured to display the multiple second controls separately around the first control, wherein the first control and the multiple second controls are separated from each other by a distance less than a distance threshold, with a relation between locations of two controls being fixed with respect to each other.

9. The device of claim 8, wherein:
a first region of the playing page is configured to display text content associated with the multimedia information being played, the text content being subject to dynamic switch,
wherein the processor is further configured to display the second control in a second region of the playing page, wherein the second region is one of a region on the playing page other than the first region, or a part of the first region.

10. The device of claim 9, wherein:
the playing page is an audio playing page,
the first region is a middle region of the playing page, and
the second region is a corner region of the playing page, the corner region being located outside the middle region.

11. The device of claim 8, wherein:
the navigation page comprises a display region and a toolbar,
at least one or more identifiers that identify the multimedia information are displayed in the display region,
the toolbar is located at a bottom of the display region, and
the first control is located at a predetermined location on the toolbar,
wherein the processor is further configured to display the second control in the display region around the predetermined location.

12. The device of claim 8, wherein the processor is further configured to perform at least one of:
in response to detecting that the second control has been displayed for longer than a preset duration threshold, hiding the second control on the interface;
in response to detecting a second operation on the first control, hiding the second control on the interface; or
in response to detecting that an operation on the second control completes, hiding the second control on the interface.

13. The device of claim 12, wherein the processor is further configured to:
hide the second control on the interface in response to detecting a third operation on at least one second control.

14. The device of claim 8, wherein the circumstance of playing the multimedia information further comprises a circumstance of switching between different multimedia information,
wherein the parameter further comprises at least one of: a form in which the first control is displayed, or an area over which the first control is displayed.

15. A non-transitory computer-readable storage medium, having stored thereon instructions that, when executed by a processor of user equipment (UE), cause the UE to perform a method for displaying an interface of a multimedia information application, the method comprising:
in response to detecting a first operation on a first control on the interface of the multimedia information application, displaying a second control on the interface;
in response to detecting a hiding trigger event, hiding the second control on the interface; and
when multimedia information is being played, dynamically adjusting a parameter for displaying the first control according to a circumstance of playing the multimedia information,
wherein the parameter comprises at least one of: a color in which the first control is displayed, or a brightness with which the first control is displayed, and
the circumstance of playing the multimedia information comprises at least one of: a progress in playing the multimedia information being played, or a tone of an audio being played,
wherein the interface comprises a navigation page and a playing page separated from the navigation page, the first operation comprises an operation with at least one of a pressing strength greater than a preset strength threshold or a pressing duration longer than a preset duration, and the method further comprises:
on the navigation page, in response to detecting an operation on the first control with at least one of a pressing strength less than the preset strength threshold or a pressing duration shorter than the preset duration, playing the multimedia information on the playing page; and
on the playing page where the multimedia information is played, in response to detecting the operation on the first control with at least one of the pressing strength less than the preset strength threshold or the pressing duration shorter than the preset duration, switching content displayed on the playing page, and
wherein the second control comprises multiple second controls, and
displaying the second control comprises displaying the multiple second controls separately around the first control, wherein the first control and the multiple second controls are separated from each other by a distance less than a distance threshold, with a relation between locations of two controls being fixed with respect to each other.

16. The storage medium of claim 15, wherein:
a first region of the playing page is configured to display text content associated with the multimedia information being played, the text content being subject to dynamic switch,
wherein the displaying the second control on the interface comprises:
displaying the second control in a second region of the playing page, wherein the second region is one of a region on the playing page other than the first region, or a part of the first region.

17. The storage medium of claim 16, wherein:
the playing page is an audio playing page,
the first region is a middle region of the playing page, and
the second region is a corner region of the playing page, the corner region being located outside the middle region.

18. The storage medium of claim 15, wherein:
the navigation page comprises a display region and a toolbar,
at least one or more identifiers that identify the multimedia information are displayed in the display region,
the toolbar is located at a bottom of the display region, and
the first control is located at a predetermined location on the toolbar,
wherein the displaying the second control on the interface comprises:
displaying the second control in the display region around the predetermined location.

19. The storage medium of claim 15, wherein the in response to detecting the hiding trigger event, hiding the second control on the interface comprises at least one of:
in response to detecting that the second control has been displayed for longer than a preset duration threshold, hiding the second control on the interface;
in response to detecting a second operation on the first control, hiding the second control on the interface; or
in response to detecting that an operation on the second control completes, hiding the second control on the interface.

20. The storage medium of claim 15, wherein the circumstance of playing the multimedia information further comprises a circumstance of switching between different multimedia information,
wherein the parameter further comprises at least one of: a form in which the first control is displayed, or an area over which the first control is displayed.

* * * * *